O. F. BRUMAN.
SHAFT BEARING.
APPLICATION FILED JAN. 2, 1912.

1,083,984.

Patented Jan. 13, 1914.

Witnesses

Inventor:
Otto F. Bruman,
By Barton & Folk,
Attys

UNITED STATES PATENT OFFICE.

OTTO F. BRUMAN, OF BERLIN, GERMANY, ASSIGNOR TO ROBERT S. HOTZ, OF CHICAGO, ILLINOIS.

SHAFT-BEARING.

1,083,984.  Specification of Letters Patent.  Patented Jan. 13, 1914.

Application filed January 2, 1912. Serial No. 668,894.

*To all whom it may concern:*

Be it known that I, OTTO F. BRUMAN, citizen of the Republic of Switzerland, residing at Berlin, Germany, have invented a certain new and useful Improvement in Shaft-Bearings, of which the following is a full, clear, concise, and exact description.

My invention relates to shaft-bearings and more particularly to bearings for steam turbines. Its object is to provide a combined bearing and stuffing box of simple construction and of the requisite strength combined with lightness of weight.

One feature of my invention consists in providing an integral casting having flanges for supporting the plates of the cylinder head and provided at one end with a longitudinal bore therethrough for receiving the stuffing box and at the other end with a chamber within which is mounted the bearings of the turbine shaft.

Another feature of my invention relates to the structure of the stuffing box.

These and other features of my invention may be more readily understood by reference to the accompanying drawings, in which—

Figure 1:
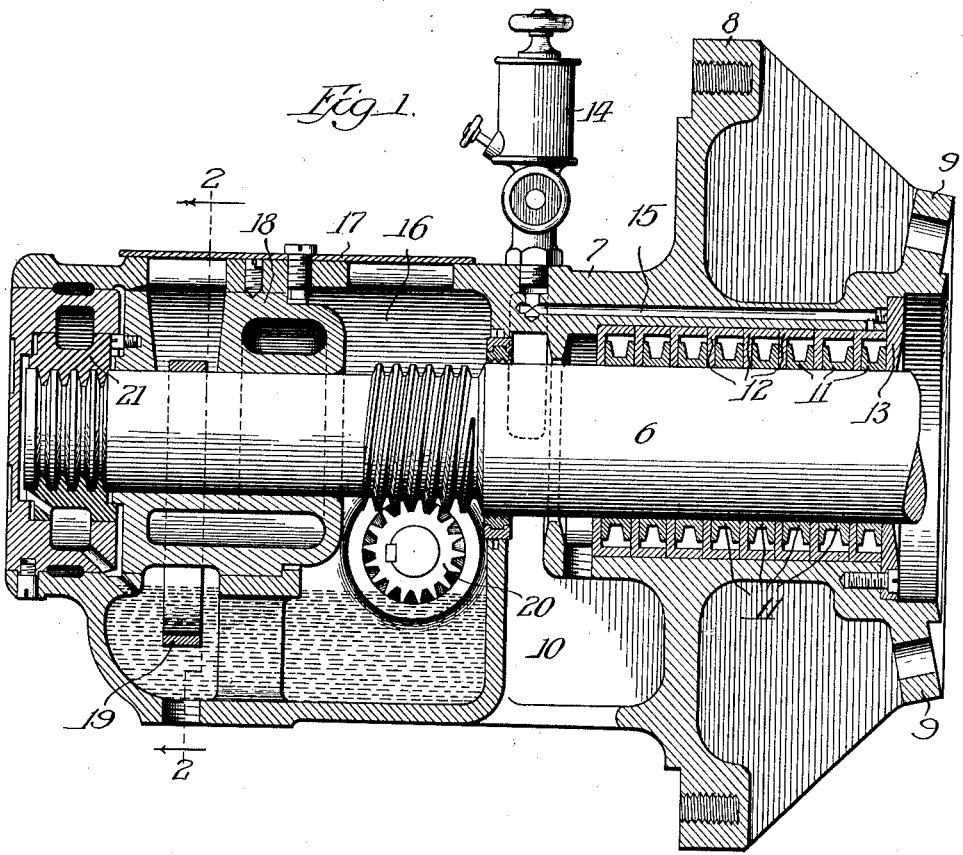
Figure 2:
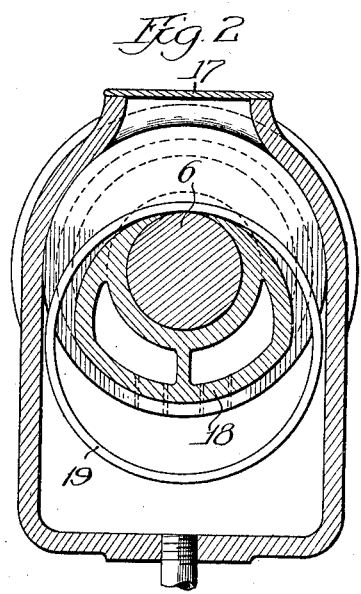

Figure 1 is a central longitudinal section through a front bearing showing the preferred embodiment of my invention; and Fig. 2 is a vertical cross section on the line 2—2 of Fig. 1.

Like reference characters refer to like parts throughout the several views.

The stuffing box and the bearing for the turbine shaft 6 is supported in an integral casting 7 which is provided with annular flanges 8, 9 to which are secured the outer and inner plates, respectively, of the cylinder heads. The casting 7 may be considered as consisting of two portions separated upon the interior of the casting by a space 10 which is provided to afford cooling of the shaft 6 and also for the draining off of water, etc. from the interior of the casing.

That half of the casting adjacent the cylinder head is provided with a bore for receiving the stuffing box. Said stuffing box comprises a series of rotary rings 11 ground on the shaft 6 and revolving therewith. These rings are, as shown, each provided with two outwardly extending circumferential flanges providing a groove or channel in the outer periphery of the ring. The rings 11 alternate with a series of stationary rings 12 of angular cross section. The angular flanges of the rings 12 each overlies the rotary ring 11 and abuts the next succeeding stationary ring. There is thus formed about the outer periphery of each ring 11 a chamber, there being thus a series of these chambers constituting a labyrinth stuffing box. An annular plate 13 is preferably provided upon the end of the casting to cover the stuffing box.

An oil cup 14, which may be of ordinary construction, is arranged to feed oil by gravity through a channel 15 to the innermost chamber of the stuffing box. The feed of the oil outward from the innermost chamber is assisted by the difference in pressure at the inner and outer end of the stuffing box, that is, in the case of a steam turbine, by the steam itself. The oil which is thus fed to the stuffing box and accumulates in the chambers thereof acts as an oil-seal and thus renders the leakage of steam through the stuffing box practically negligible. The stuffing box of my invention needs no attention, the oil being supplied thereto from the cup 14 as may be required, and the consumption of oil thereby is very slight, as for example, about one cup per day or less.

At the end of the stuffing box is the intermediate space 10 provided for cooling the shaft 6 and for drawing off any water, etc., which may have forced itself through the stuffing box.

The outer end of the casting is preferably in the form of a casing providing a chamber 16 to which access may be had through a cover 17. Supported upon the interior of this casing is a water cooled bearing 18 which may be of the usual construction oiled in any well known manner, as for example, by a ring 19 which dips into the oil in the bottom of the casing.

In addition to the stuffing box and bearing which, in my invention, is common to both the front and rear bearings of a steam turbine, the front bearing is provided as shown with a worm gear 20 for driving the usual governor (not shown) and with an end thrust bearing 21. In other respects the front and end bearings are substantially alike and hence a description of the one will suffice for both.

What I claim is:—

1. In a shaft bearing for a turbine engine, the combination with an integral casting having flanges for supporting the plates of the cylinder head of the turbine, said integral casting being provided with a bore in one end thereof and a chamber in the other end thereof, of a stuffing box arranged in said bore and a shaft-bearing mounted in said chamber.

2. In a stuffing box for a rotary shaft, the combination with a shaft, of a plurality of rings secured to said shaft, each of said rings being provided with a circumferential groove, of a series of stationary rings of angular cross section interposed between each of said revolving rings and abutting each other, and means for supplying oil to said rings.

3. In a stuffing box for a rotary shaft, the combination with a casting having an enlarged bore therein for receiving the shaft, of said shaft, a series of rotary rings secured to said shaft, each of said rings having outwardly extending circumferential end flanges, thereby providing a circumferential groove in said ring, and a series of stationary rings alternating with said rotary rings and contacting with the flanges of said rotary rings, said stationary rings having angular flanges overlying said rotary rings.

In witness whereof, I hereunto subscribe my name this 4th day of December, A. D. 1911.

OTTO F. BRUMAN.

Witnesses:
 HENRY HASPER,
 WOLDEMAR HAUPT.

---

Copies of this patent may be obtained for five cents each, by addressing the "Commissioner of Patents, Washington, D. C."